United States Patent
Smith et al.

[15] 3,656,905
[45] *Apr. 18, 1972

[54] HYDROGEN MANUFACTURE

[72] Inventors: Calvin S. Smith; William J. McLeod, both of El Cerrito, Calif.

[73] Assignee: Chevron Research Company, San Francisco, Calif.

[ * ] Notice: The portion of the term of this patent subsequent to Oct. 6, 1987, has been disclaimed.

[22] Filed: Nov. 2, 1970

[21] Appl. No.: 86,162

Related U.S. Application Data

[63] Continuation-in-part of Ser. No. 788,262, Dec. 31, 1968, Pat. No. 3,532,467, which is a continuation-in-part of Ser. No. 736,520, May 17, 1968, which is a continuation-in-part of Ser. No. 665,106, Sept. 1, 1967, abandoned.

[52] U.S. Cl. ............................ 23/212 R, 23/2 A, 23/150, 23/213, 252/373
[51] Int. Cl. ...................... C01b 1/02, C01b 1/16, C01b 21/00
[58] Field of Search ................... 23/212, 213, 210, 150, 2 A; 252/373

[56] References Cited

UNITED STATES PATENTS

| | | | |
|---|---|---|---|
| 3,532,467 | 10/1970 | Smith et al. | 23/213 X |
| 3,401,111 | 9/1968 | Jackson | 23/210 X |
| 2,632,689 | 3/1953 | Latchum | 23/153 |
| 2,870,096 | 1/1959 | Baumann | 23/213 X |
| 3,147,080 | 9/1964 | Jahnig | 23/212 |
| 3,297,408 | 1/1967 | Marshall | 23/210 X |
| 3,361,534 | 1/1968 | Johnson et al. | 23/212 X |
| 3,400,546 | 9/1968 | Karwat | 23/212 |
| 3,418,082 | 12/1968 | Ter Haar | 23/213 |
| 3,420,633 | 1/1969 | Lee | 23/210 |

*Primary Examiner*—Edward Stern
*Attorney*—A. L. Snow, Frank E. Johnston, G. F. Magdeburger, C. J. Tonkin and T. G. De Jonghe

[57] ABSTRACT

A process for producing high pressure hydrogen which comprises: (a) reforming hydrocarbons with low pressure steam to produce a gas stream comprising hydrogen and $CO_2$; (b) centrifugally compressing at least a portion of the gas stream comprising hydrogen and $CO_2$ to obtain a stream comprising compressed hydrogen and $CO_2$; (c) removing $CO_2$ from the compressed gas stream comprising hydrogen and $CO_2$ by absorbing $CO_2$ in a physical absorbent; (d) using high pressure steam to drive a turbine which turbine in turn drives the centrifugal compressor used to compress the hydrogen and $CO_2$; and (e) using low pressure exhaust steam from the turbine as said low pressure steam for reforming hydrocarbons in step (a). Preferably the low pressure steam is at a pressure between 50 and 500 psig, the high pressure steam is at a pressure between 200 and 2000 psig, and there is at least a 150 psi differential in pressure between the low and high pressure steam. According to a preferred embodiment, $CO_2$ is removed using a mixed absorbent comprising a chemical absorbent and a physical absorbent.

6 Claims, 1 Drawing Figure

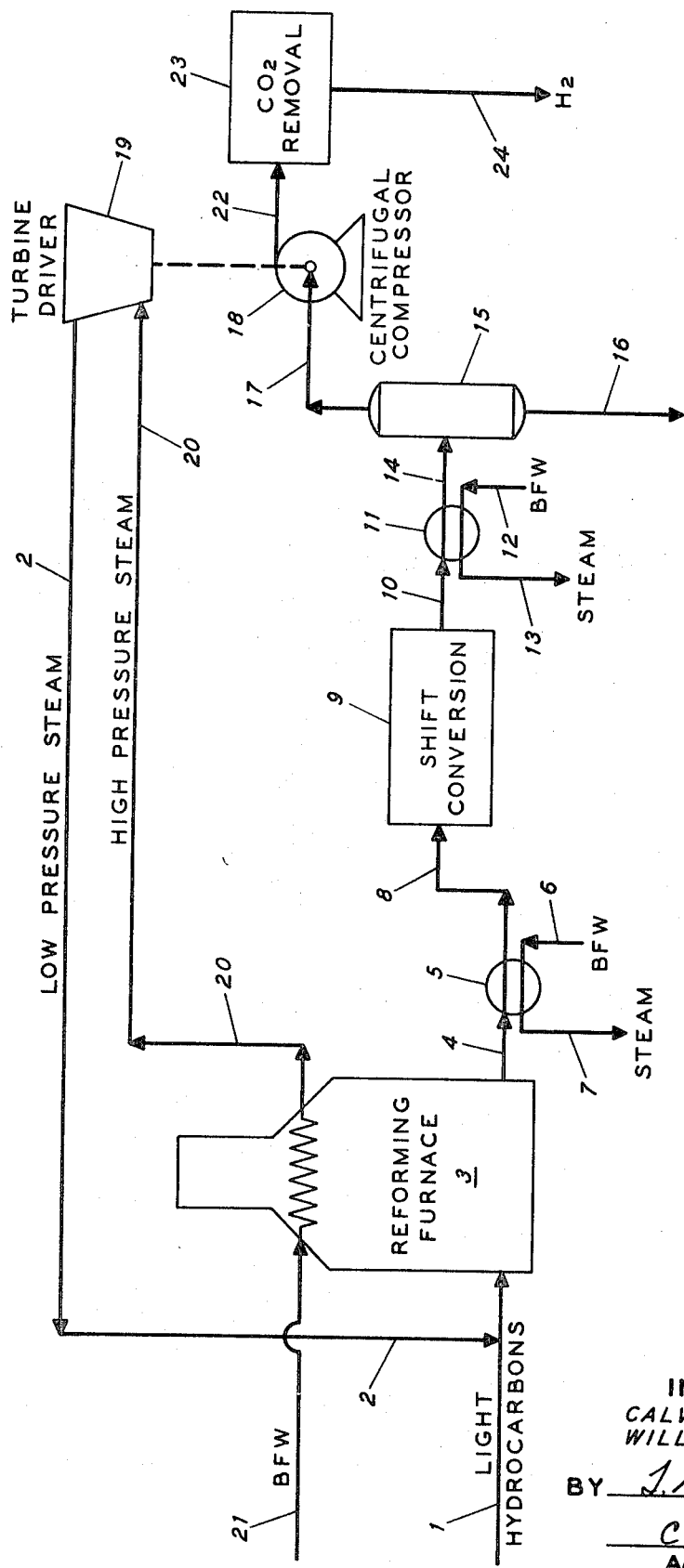

HYDROGEN MANUFACTURE

CROSS REFERENCES

This application is a continuation-in-part of application Ser. No. 788,262 filed Dec. 31, 1968 now U.S. Pat. No. 3,532,467, entitled "Hydrogen Manufacture with Integrated Steam Usage," which in turn is a continuation-in-part of application Ser. No. 736,520 filed May 17, 1968, entitled "Hydrogen Manufacture Using Centrifugal Compressors," which in turn is a continuation-in-part of application Ser. No. 665,106 filed Sept. 1, 1967, and now abandoned. The present application is also related to Ser. No. 115,554, titled "Hydrogen Production," filed Feb. 16, 1971.

BACKGROUND OF THE INVENTION

1. Field of the Invention

This invention relates to processes for the production, compression, and purification of gases; and, more particularly, it relates to a process for supplying high pressure, high purity hydrogen gas at elevated pressure. In a still more particular aspect, the invention relates to a process for obtaining high pressure, high purity hydrogen for use in a hydroconversion process. By hydroconversion process is meant a process wherein hydrogen is reacted with hydrocarbons so as to convert the hydrocarbons to more desirable hydrocarbons or hydrocarbon products.

2. Description of the Prior Art

A. Means for obtaining raw, hydrogen-rich gas. There are a number of current processes available for the production of raw hydrogen. Many of these processes use hydrocarbons as a source of hydrogen. Two of the most widely practiced methods of obtaining raw, hydrogen-rich gas are steam reforming and partial oxidation.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes most of the hydrocarbons react with steam to form hydrogen and carbon oxides. The tubes containing the catalyst are located in a reforming furnace, which furnace heats the reactants in the tubes to temperatures of 1,200+ – 1,700° F. Pressures maintained in the reforming furnace tubes range from atmospheric to 450 psig. If a secondary reforming furnace or reactor is employed, pressures used for reforming may be as high as 450 psig to 700 psig. In secondary reformer reactors, part of the hydrocarbons in the effluent from the primary reformer is burned with oxygen. Because of the added expense, secondary reformers are generally not used in hydrogen manufacture but are used where it is desirable to obtain a mixture of $H_2$ and $N_2$, as in ammonia manufacture. The basic reactions in the steam reforming process are:

$$C_nH_{2n+2} + nH_2O \rightleftharpoons nCO + (2n+1)H_2$$
$$C_nH_{2n+2} + 2nH_2O \rightleftharpoons nCO_2 + (3n+1)H_2$$

e.g., methane-steam:

$$CH_4 + H_2O \rightleftharpoons CO + 3H_2; \text{ and}$$
$$CH_4 + 2H_2O \rightleftharpoons CO_2 + 4H_2$$

Because the hydrogen product is used in high-pressure processes, it is advantageous to operate at high pressure to avoid high compression requirements. However, high pressures are adverse to the equilibrium; and higher temperatures must be employed. Consistent with hydrogen purity requirement of about 95 to 97 volume percent $H_2$ in the final $H_2$ product and present metallurgical limitations, generally the single stage reforming is limited commercially to about 1,550° F. and 300 psig.

In typical partial oxidation processes, a hydrocarbon is reacted with oxygen to yield hydrogen and CO. Insufficient oxygen for complete combustion is used. The reaction may be carried out with gaseous hydrocarbons or liquid or solid hydrocarbons; for example, with methane, the reaction is:

$$CH_4 + \tfrac{1}{2}O_2 \rightleftharpoons H_2 + CO$$

With heavier hydrocarbons, the reaction may be represented as follows:

$$C_7H_{12} + 2.8\,O_2 + 2.1\,H_2O \rightleftharpoons 6.3\,CO + 0.7\,CO_2 + 8.1\,H_2$$

Both catalytic and noncatalytic partial oxidation processes are in use. Suitable operating conditions include temperatures from 2,000° F. up to about 3,200° F., and pressures up to about 1,200 psig, but generally pressures between 100 aNd 600 psig are used. Various specific partial oxidation processes are commercially available, such as the Shell Gasification Process, Fauser-Montecatini Process, and the Texaco Partial Oxidation Process.

There is substantial CO in the hydrogen-rich gas generated by either reforming or partial oxidation. To convert the CO to $H_2$ and $CO_2$, one or more CO shift conversion stages are typically employed. The CO shift conversion reaction is: $CO + H_2O \rightleftharpoons H_2 + CO_2$ This reaction is typically effected by passing the CO and $H_2O$ over a catalyst such as iron oxide activated with chromium. The reaction kinetics are faster at higher temperature, but the equilibrium to hydrogen is favored by lower temperatures. Therefore, it is not uncommon to have a high temperature shift stage followed by a low temperature shift stage. Pressure has little bearing on the equilibrium in the water-gas shift reaction.

B. $CO_2$ or $CO_2 + H_2S$ removal.

Because most hydrogen using processes, particularly hydroconversion processes, operate more efficiently with high purity hydrogen, it is generally required to remove impurities, such as $CO_2$, from the raw hydrogen generated in the hydrogen plant before the hydrogen is passed to the hydrogen-using process. Perhaps the most widespread method of removing $CO_2$ from other gases is the absorption of $CO_2$ in an alkanolamine, such as diethanolamine (DEA) or monoethanolamine (MEA). Largely because of its relatively low molecular weight, MEA is generally the preferred absorbent of the alkanolamines. The $CO_2$ forms a loose chemical bond with the amine when it is absorbed.

In using any of the commonly used alkanolamine absorbents, an absorber and stripper are typically arranged in a figure eight process configuration. The $CO_2$-containing gas is fed into the bottom of the absorber where $CO_2$ is absorbed in downward flowing absorbent. Purified gas with the $CO_2$ removed leaves the top of the absorber. Rich absorbent from the bottom of the absorber is passed to the top of a stripping column where it is regenerated as it passes from the top to the bottom of the stripping column. The regenerated absorbent passes from the bottom of the stripper to the top of the absorber to complete the figure eight path of the absorbent as it flows down through the absorber trays, or packing material, absorbing $CO_2$. A large amount of heat is required to strip the $CO_2$ from the MEA absorbent which is typically used because of the chemical bond that occurs between the $CO_2$ and the MEA. For instance, in a large hydrogen plant producing $135 \times 10^6$ standard cubic feed per day of hydrogen, over $300 \times 10^6$ BTU's per hour are generally required to reboil the MEA in order to effect the regeneration of the MEA. These $300 \times 10^6$ BTU's per hour are equivalent to over 1,000,000 dollars per year in terms of steam (at a value of about 40 cents per thousand pounds) that could be generated.

Over a period of time, a considerable amount of MEA will be lost out the top of the absorber as large volumes of gas carry entrained MEA out the top of the absorber in spite of preventive measures. Further MEA is lost due to pumping losses as large volumes of absorbent are required and therefore circulated to remove the great quantities of $CO_2$ that are typically formed in modern hydrogen production plants. Other common $CO_2$ absorption systems — for example, hot carbonate — are generally similar to the alkanolamine system in the respects described above with only moderate reduction in regeneration heat requirements.

Since the alkanolamine absorbents tend to degrade, a "reclaimer" is commonly used to purify the absorbent. The reclaimer is essentially a small reboiler. It is fed a slip-stream of the absorbent from the bottom of the stripper. Only that portion of the slipstream that is vaporized is returned to the stripper system. Heavy tarry material collects in the bottom of the reclaimer and is periodically withdrawn and passed to sewerage as a spent alkanolamine stream. Common practice is to clean the reclaimer is frequently as once a week. The cleaning procedure typically involves taking the reclaimer off-stream, draining the spent alkanolamine and heavy tarry material, and steam cleaning the reclaimer.

It is thus apparent that cleaning the reclaimer will result in losses of absorbent in addition to those losses caused by entrainment and pumping leakage. Although the alkanolamine is expensive, this cleaning procedure is necessary to avoid build-up of corrosive bodies in the $CO_2$ absorption system. Corrosion, which would be worse without the reclaimer, still is a considerable problem in the alkanolamine $CO_2$ absorption systems.

Various absorption systems other than alkanolamine-$CO_2$ absorption systems have been proposed in recent years. For example, U.S. Pat. No. 3,347,621 discloses a method of removing acidic gases including $CO_2$ from gaseous mixtures by contacting the gaseous mixture with a liquid absorbent comprising diisopropanolamine and a cyclotetramethylene sulfone. The liquid absorbent may comprise 15–45 percent by weight of diisopropanolamine and 55–85 percent by weight of the sulfone or 1–25 percent by weight of water, 15–45 percent by weight of diisopropanolamine and 50–84 percent by weight of the sulfone. The use of the above-mentioned absorbent is described further in the Oil and Gas Journal, June 30, 1969, starting at page 117. Preferably, the absorbent is composed of sulfolane (tetrahydrothiophene dioxide), DIPA (diisopropanolamine), and water. The relative amounts of these components can be varied to yield a composition which is suitable for the amounts of acid gases to be removed and other process variables.

The DIPA constituent accomplishes chemical absorption, while the relatively inert sulfolane adds physical absorption ability to the solvent. This combination of absorption capabilities offers advantages both for loading and unloading of the solution.

The DIPA combines with sour components in an acid-base reaction essentially nonsensitive to pressure, whereas sulfolane adds physical solubility which is proportional to the acid gas pressure. The net result is a solvent having a good affinity for acid gas components at low-to-medium partial pressures, and an extremely high affinity for these components at high partial pressures.

Similar to the use of sulfolane and DIPA is the process disclosed in U.S. Pat. No. 3,352,631, which is a process for separating carbon dioxide from gaseous mixtures by absorbing the carbon dioxide from the mixture in a liquid absorbent consisting of (a) 5–25 percent weight of water, (b) 15–60 percent weight of monoethanol—or diethanolamine or mixtures thereof and (c) 28–80 percent weight of a cyclotetramethylene sulfone (e.g., sulfolane).

Various physical absorbents have been disclosed. For example, U.S. Pat. No. 2,649,166 discloses the use of dimethoxytetraethylene glycol as a physical absorbent for removing $CO_2$ from gases such as hydrogen. U.S. Pat. No. 2,926,757 discloses the use of propylene carbonate as a physical absorbent for $CO_2$. U.S. Pat. No. 3,120,993 discloses physical absorbents such as N-alkylated lactams of the $\gamma$ or $\delta$ amino acids derivable from butyric acid, valeric acid and caproic acid, namely, the N-alkylated pyrrolidones or piperidones which may be substituted with one or two lower alkyl groups, e.g., methyl groups, on the hetercyclic nucleus.

U.S. Pat. No. 3,225,519 discloses the use of a polar compound, specifically acetone, as a physical absorbent for $CO_2$. U.S. Pat. No. 3,324,627 discloses the use of a polar solvent such as methanol together with a physical absorbent such as a pyrrolidone or a piperidone for $CO_2$ absorption.

British Pat. No. 1,024,412 discusses the use of combined physical and chemical absorbents in processes for the removal of acid gases from other gases such as refinery gases or light hydrocarbon gases. As indicated in the British Patent, the use of chemical absorbents such as alkanolamines involves the formation of alkanolamine salts of the acid gases, these salts being subsequently decomposed, usually by heating, to regenerate the solution and to drive off the absorbed compounds. Such solutions, however, have only a relatively limited solubility for acid gases even when the latter are under a high partial pressure, which results in the necessity to use high solution-to-gas ratios.

British Pat. No. 1,024,412 points out that, as distinct from such "chemical solvents" as the alkanolamines, certain classes of materials are regarded as "physical solvents," such as N-alkylated pyrrolidones and N-alkylated piperidones. The latter solvents or absorbents appear to act in a purely physical manner, absorbing acidic gases physically without the formation of any apparent reaction product. However, one of the problems encountered with such physical solvents is the difficulty of obtaining a complete or substantially complete removal of the acidic contaminants.

According to the process disclosed in British Pat. No. 1,024,412, acidic gases are removed from gases such as light hydrocarbons by contacting the gas mixtures with a mixed solvent consisting of at least one weakly basic amine (such as monoethanolamine or diisopropanolamine) and a physical absorbent such as an N-alkylated pyrrolidone or an N-alkylated piperidone.

South African application No. 69/5183 discloses a process for producing purified hydrogen wherein $CO_2$ is removed from compressed hydrogen using a combined physical and chemical absorbent.

In the past, although physical absorbents and mixtures of chemical absorbents with physical absorbents have been used for removing acidic gases from natural gases and other pressurized hydrocarbon gas streams, mostly chemical absorbents have been used for removing $CO_2$ from mixtures of $CO_2$ with hydrogen when high purity hydrogen is desired as, for example, in a hydroconversion process such as hydrocracking or hydrotreating.

Furthermore, although chemical absorbents have been used at higher pressures, usually the chemical absorbents have been used for removing $CO_2$ from hydrogen at relatively low pressures, usually below about 450 psig.

C. Compression of high purity hydrogen

Some of the processes which use high purity hydrogen as a reactant are: hydrodesulfurization, operating at pressures between about 100 and 1,500 psig; hydrotreating, operating at pressures between about 200 and 2,000 psig; hydrocracking, operating at pressures between about 450 and 3,000 psig; and thermal hydrodealkylation, operating at pressures between about 450 and 1,000 psig. All of these just-mentioned hydroconversion processes may operate even higher pressures (for example, up to 10,000 psig) than just given but seldom will operate at pressures lower than the range given. Thus, it can be seen that many of the processes which use hydrogen require the hydrogen at a high pressure, which in most cases means generated hydrogen gas must be compressed before being passed to a hydrogen-using process.

Basically, all compressors may be considered as belonging to one of two categories; i.e., their principles involve either that of true mechanical compression (positive displacement) or centrifugal compression. Compressors utilizing true mechanical compression are so considered because the act of volumetric reduction is accomplished by means of a compressing element. The compression element may be in the form of a piston which in its particular motion entraps and displaces gas within a suitably designed and fully enclosed housing. Motion may be reciprocating during which the element, in the form of a piston, passes back and forth within dimensional limits over the same course within a cylinder in a straight-line direction.

Centrifugal compression is accomplished by centrifugal force exerted on an entrapped gas during rotation of an impeller at high speed. Most centrifugal compressors depend primarily on centrifugal force and high tangential velocity of the fluid in the periphery of the impeller (or rotors or blades in the instance of some turbocompressors) to produce the desired head or discharge pressure. In this specification, the terms "centrifugal compression" or "compressor" are meant to include turbine compression or turbo-compressors, including, for example, axial-flow compressors. In the broad sense of centrifugal compression used herein, compression is effected, at least to a substantial degree, by conversion of velocity head to pressure head.

The reciprocating compressor is used for hydrogen compression, but it has some severe disadvantages, particularly for large-size plants:

1. All parts are subject to unbalanced, reciprocating stresses; and foundations, frames and other parts must be large. To minimize vibration, speeds are low (400 – 700 RPM); and capacity is low. Therefore, in large plants, several machines are required. Cost of installing, instrumenting, protecting and piping several machines is high. Considerable land is required, and plants are bigger and more complex, making them more difficult to control.

2. The reciprocating machine is less reliable than centrifugal machines, and it is common practice to design plants with one or two expensive spare machines ready to come on-stream in the event of a failure.

3. The reciprocating machine produces a pulsating gas supply which sonically transmits vibration to piping instruments and other plant facilities. Such vibrations can cause hazardous failures with hydrogen at high pressure.

4. The low speed of reciprocating compressors tends to limit prime movers to low speed, electric motors or gas engines. While it is possible to use high speed steam or gas turbines, large reduction gears must be used. The pounding of the reciprocating loads has led to poor experience with these units. Hydrocracking and hydrogen manufacturing processes can be designed to produce byproduct steam if it could be used in steam turbine drivers. However, for the reasons just given, this byproduct steam is generally not used to drive the reciprocating compressors.

5. Reciprocating compressors are particularly susceptible to severe damage if liquid is present in the gas being compressed.

By comparison, centrifugal compressors are reliable, rugged, in most cases relatively simple, have large capacities, are relatively small, have balanced stresses, and generally cause relatively little vibration or pulsation in the plants. They can be driven by high speed, steam turbines or gas turbines.

However, centrifugal compressors cannot, with any reasonable degree of feasibility, be used as high purity hydrogen compressors.

Compression ratios (ratio of discharge pressure to inlet pressure for one stage of compression) obtainable with a centrifugal compressor are a function of the molecular weight of the gas to be compressed. With pure hydrogen having a molecular weight of 2, compression ratios are limited to about 1.025. Because of this low compression ratio for hydrogen, centrifugal compressors are not practical to date for compression of high purity hydrogen.

Table I below illustrates the sharp decrease in compression ratio for centrifugal compression as the molecular weight of the gas being compressed decreases. The number of stages used in the compression is the same for each case in Table I.

TABLE I

| Barometer, psia | 14.4 | 14.4 | 14.4 |
|---|---|---|---|
| Inlet temperature, °F. | 60.0 | 60.0 | 110.0 |
| k (Cp/Cv for inlet gas) | 1.11 | 1.398 | 1.36 |
| Inlet capacity, cfm | 20,000.0 | 20,000.0 | 20,000.0 |
| Head, ft.-lb. per lb. | 22,000.0 | 22,000.0 | 22,000.0 |
| Molecular weight | 63.0 | 28.95 | 10.1 |
| Inlet pressure, psia | 16.73 | 14.73 | 14.08 |
| Discharge pressure, psia | 79.53 | 29.73 | 17.99 |
| Compression ratio | 4.75 | 2.01 | 1.28 |

As previously indicated, it is not practical to use centrifugal compressors to compress high purity hydrogen to high pressures because of the multitude of stages that would be required. For example, the centrifugal compression ratio (ratio of discharge pressure to inlet pressure for one stage of centrifugal compression) with hydrogen, molecular weight of 2, is limited to about 1.025. Consequently, over 75 stages of centrifugal compression would be necessary to bring the pressure of hydrogen up to 1,700 psig starting from a pressure of 200 psig. On the other hand, two stages of a reciprocating positive displacement compressor could increase the pressure from 200 psig to 1,700 psig. Thus, in spite of their problems previously discussed, reciprocating compressors have heretofore been used in bringing high purity hydrogen to high pressure.

SUMMARY OF THE INVENTION

According to the present invention, an improved process is provided for manufacturing high pressure hydrogen with advantageous integrated steam usage which comprises: (a) reforming hydrocarbons with low pressure steam to produce a gas stream comprising hydrogen and $CO_2$; (b) centrifugally compressing at least a portion of the hydrogen and $CO_2$ to obtain a stream comprising compressed hydrogen and $CO_2$; (c) removing $CO_2$ from the compressed gas stream comprising hydrogen and $CO_2$ using a physical absorbent; (d) using high pressure steam to drive a turbine which turbine in turn drives the centrifugal compressor used to compress the hydrogen and $CO_2$; and (e) using low pressure exhaust steam from the turbine as said low pressure steam for reforming hydrocarbons in step (a). Preferably the low pressure steam is at a pressure between 50 to 550 psig, the high pressure steam is at a pressure between 200 and 2,000 psig, and there is at least a 150 psi differential in pressure between the low and high pressure steam. Still more preferably, the low pressure steam is at a pressure between 100 to 350 psig and the high pressure steam is at a pressure between 400 and 1,600 psig.

Our application Ser. No. 788,262 is directed to a hydrogen production process wherein $H_2$-$CO_2$ is produced by reforming and is centrifugally compressed using steam as motive power and using exhaust steam from the compression step as process steam for reforming. The present patent application is, among other features, directed to the added particularly preferred feature of that process wherein $CO_2$ is removed from the centrifugally compressed $H_2$-$CO_2$ using a physical absorbent, most preferably a mixed absorbent containing a physical solvent and a chemical solvent.

The surprising advantages obtained by centrifugally compressing a hydrogen gas stream prior to complete $CO_2$ removal are discussed in our application Ser. No. 736,520. As explained in our earlier application, Ser. No. 736,520, the molecular weight of the hydrogen-rich feed gas to centrifugal compression should be at least about four.

The "physical absorbent" used in the process of the present invention may be an essentially pure physical solvent or it may be a mixture of a physical solvent with a chemical solvent, but it is important that the $CO_2$ absorbent be at least partially composed of physical absorbent to take particular advantage of the high pressure of the $H_2$-$CO_2$ gas mixture to be purified.

According to a preferred embodiment of the process of the present invention, a mixed absorbent comprising a chemical absorbent and a physical absorbent is used to remove $CO_2$ from the centrifugally compressed $H_2$-$CO_2$.

Although the amount of chemical absorbent mixed with the physical absorbent to comprise the mixed absorbent is not a critical aspect of this preferred embodiment of the present invention, it is preferred to use minor amounts of chemical absorbent and major amounts of physical absorbent. The amount of chemical absorbent in the mixed absorbent can be between about 1.0 and 49 weight percent chemical absorbent based on the total weight of the absorbent mixture, but preferably is between about 5.0 and 20 weight percent. The amount of physical absorbent in the mixed absorbent mixture can be between 51 and 99 weight percent, but preferably is between about 75 and 90 weight percent. Other components besides the chemical absorbent and physical absorbent can be present in the mixed absorbent. Thus, the mixed absorbent can also contain water.

Because of the high pressure obtained by centrifugally compressing the $H_2$ and $CO_2$ according to the process of the present invention, nearly all of the $CO_2$ may be removed from the $H_2$ relatively easily by physical absorption of the $CO_2$. The chemical absorbent which is used together with the physical absorbent according to the above-mentioned preferred embodiment of the present invention operates to improve still further the ability of the absorption system to reduce the $CO_2$ concentration in the purified hydrogen gas down to very low levels, for example, below about 1,000 parts per million by volume of $CO_2$ in the purified hydrogen gas.

The high pressure required in the absorption step of the present invention generally is between about 450 psig and 4,000 psig, but pressures as high as 5,000 to 10,000 psig may be employed. However, the more usual pressure range is between 900 psig and 3,000 psig.

According to a preferred embodiment of the present invention, the reforming of hydrocarbons with steam to produce gases comprising $H_2$ and $CO_2$ is carried out at a pressure between atmospheric and 450 psig and at least a portion of the gas comprising hydrogen and $CO_2$ obtained by reforming is centrifugally compressed from a pressure below about 450 psig to a substantially higher (at least 150 psi higher) pressure before the molecular weight of the hydrogen-$CO_2$ gas to be compressed is reduced below 4 by $CO_2$ removal.

BRIEF DESCRIPTION OF THE DRAWING

The drawing is a schematic flow sheet of a preferred embodiment of the hydrogen manufacturing process with integrated steam usage.

DETAILED DESCRIPTION

Referring now in more detail to the embodiment of the invention shown in the drawing, light hydrocarbon in line 1 is combined with low pressure steam in line 2 and introduced to reforming furnace 3 for reaction to produce a hydrogen gas. Typically the light hydrocarbon is natural gas comprised mostly of methane. The natural gas is desulfurized using activated carbon or molecular sieves to adsorb sulfur compounds. IF excessive sulfur compounds remain in the feed, the nickel catalyst which is typically used to speed up the kinetics of the reaction of methane with $H_2O$ is poisoned.

Generally the reforming reaction in furnace 3 takes place at a pressure of about 300 psig and a temperature of about 1,500° F. Thus, there is substantial heat present in the hydrogen-rich gas containing $CO_2$ and CO withdrawn from reforming furnace 3 via line 4. This heat is removed by boiler feed water (BFW) introduced via line 6 to boiler 5. Steam is withdrawn from the boiler via line 7. The cooled gases are withdrawn from the boiler via line 8. Usually the gases are withdrawn from boiler 5, or other heat exchanger means such as direct water quench, at a temperature of about 700° F.

The gas stream in line 8 contains several percent carbon monoxide which is desirably shifted with steam to produce hydrogen and $CO_2$. The shift conversion is accomplished in shift conversion zone 9. Preferably, shift conversion zone 9 is comprised of a high temperature shift conversion step operating at about 650° to 800° F., followed by a low temperature CO shift conversion step operated at about 350° to 500° F. The high temperature shift conversion step employs an iron-chrome catalyst and the low temperature shift conversion stage employs a copper-zinc oxide catalyst.

The hydrogen gas stream, now enriched in hydrogen because of the CO shift conversion, is withdrawn from shift conversion zone 9 via line 10 at about 350° to 500° F. Heat is removed from this hydrogen gas stream by boiler feed water introduced via line 12 to boiler 11. Steam which is produced is withdrawn via line 13. The steam which is produced in boiler 11 is usually about 40 psig steam whereas the steam produced in boiler 5 and withdrawn in line 7 is substantially higher pressure steam. The cool hydrogen gas stream is withdrawn from boiler 11 via line 14 and introduced to separator 15. Condensate which results from cooling the hydrogen gas stream is withdrawn via line 16 from the bottom of separator 15. Typically the hydrogen gas stream entering separator 15 is at a temperature of about 90° F. before cooling subsequent to boiler 11 by exchange with cooling water or by heat exchange with air in a fin fan cooler. The hydrogen gas which has been substantially freed of water but which still contains the $CO_2$ resulting from reforming in furnace 3 and shift conversion in zone 9 is introduced via line 17 to centrifugal compressor 18.

As indicated previously, the advantages and many of the other factors pertinent to centrifugal compression prior to complete $CO_2$ removal are disclosed in our application Ser. No. 736,520, which application is incorporated by reference into the present application. Because of the $CO_2$ present in the hydrogen gas feed to centrifugal compressor 18, molecular weight of the hydrogen gas is sufficient so that centrifugal compression is feasible to obtain high pressure hydrogen, for example, 900 psig and above. As explained in our earlier application Ser. No. 736,520, if essentially all of the $CO_2$ is removed prior to compression, then the molecular weight of the gas is too low to make use of centrifugal compressors feasible. Thus, reciprocating compressors would be required. Reciprocating compressors, in turn, are not as dependable and in many respects, are more expensive than centrifugal compressors. More importantly for purposes of the present invention, reciprocating compressors are not amenable to drive by means of a steam turbine driver.

Turbine driver 19 is driven by high pressure steam introduced via line 20. The high pressure steam is obtained from boiler feed water which is introduced to reforming furnace 3 via line 21. The boiler feed water is heated in the connection section of the reforming furnace to generate the high pressure steam. Steam to drive turbine 19 may also be advantageously obtained by further heating in reforming furnace 3 the steam produced in boilers 5 or 11.

As indicated in the "Summary of the Invention," the high pressure steam is at a substantially higher pressure than the low pressure steam exhausting from turbine driver 19 via line 21. Thus, the terms "high" and "low pressure" are relative and are best defined as steam pressure levels having sufficient pressure differential to furnish practical motive power for a turbine driver such as turbine driver 19 but yet with the low pressure exhaust steam being of sufficient pressure to enter a steam hydrocarbon reforming furnace as process steam. Example pressures would be 500 to 1,500 psig high pressure steam, preferably about 900 psig, and 150 to 300 psig low pressure steam exhausting from the turbine in line 2.

As indicated earlier, the low pressure steam exhausting from the turbine is combined with natural gas in line 1 and is fed to reforming furnace 3. Thus, the steam generated from the heat in the convection section of reforming furnace 3 is utilized twice in an integrated fashion in the present process for high pressure hydrogen manufacture. The steam is utilized first at its higher pressure in order to drive turbine driver 19 which, in turn, drives centrifugal compressor 18. The low pressure exhaust steam from the turbine is then utilized as process steam which reacts with the light hydrocarbon in reforming furnace 3 to produce a gas stream comprising hydrogen withdrawn in line 4.

Although high pressure steam has been used in other applications to furnish motive power to drive a steam turbine with subsequent utilization of the turbine exhaust steam, it is believed that no use has been proposed such as in the present invention prior to applicants' invention of the integrated process. It must be borne in mind that among other features, the present process integrates the double utilization of steam with centrifugal compression in a high pressure, high purity hydrogen manufacturing process, particularly one wherein the raw hydrogen is produced by reforming.

Referring again to the drawing, a mixture of high pressure hydrogen and $CO_2$ is removed from centrifugal compressor 18 via line 22. $CO_2$ is removed from the $CO_2$-hydrogen gas mixture in $CO_2$ removal zone 23. Preferably the $CO_2$ is removed by absorption of $CO_2$ into a physical absorbent. The term "physical absorbent" is used herein in contrast to chemical absorbent. Physical absorbents absorb increasing amounts of the constituent sought to be absorbed, for example $CO_2$, with increasing pressure and release the absorbed constituent by simply reducing the pressure on the absorbent with little or no heating. The absorption mechanism of "chemical absorbents" such as monoethanolamine, involves the formation of salts or other decomposable reaction products; i.e., products which when heated decompose to release the chemically absorbed constituent, for example $CO_2$, and thus regenerate the chemical absorbent.

Examples of physical absorbents are methanol, acetone or an N-methyl-pyrrolidone. As discussed in our Ser. No. 736,520, it is surprisingly advantageous to utilize high pressure $CO_2$ removal, particularly using a physical absorbent in conjunction with centrifugal compression of the hydrogen-$CO_2$ gas mixture.

As indicated previously under "Summary of the Invntion," the process of the present invention requires $CO_2$ removal from the centrifugally compressed $H_2$-$CO_2$ gas using a physical absorbent but the physical absorbent solution can contain components other than physical absorbents. In many instances, it is preferable to use only a physical absorbent for the removal of $CO_2$ rather than, for example, a mixture of a physical absorbent with a chemical absorbent. When using only the physical absorbent, there are no minor amounts of chemical absorbents in the system to create a problem of regeneration of the absorbent solution. Also, the $CO_2$ removal system is simplified in that only one absorbent or at least just one type of absorbent is handled in the system. Relatively small residual amounts of $CO_2$ which may remain in the hydrogen gas after $CO_2$ removal using only a physical absorbent can be removed if necessary by a separate very small chemical absorption step. More preferably, small residual amounts of $CO_2$ remaining after the physical absorption step are effectively removed from hydrogen gas by a catalytic methanation step which converts both $CO_2$ and CO to methane. Catalytic methanation can thus be employed in zone 23 to reduce the carbon oxides down to a very low level, for example, below 40 parts per million to thus obtain a hydrogen gas in line 24 which is particularly suitable for use in a hydroconversion process.

According to an alternate preferred embodiment of the present invention, the $CO_2$ concentration in the centrifugally compressed hydrogen-rich gas mixture comprising $H_2$ and $CO_2$ is reduced to a very low level by using a mixed absorbent comprising a physical absorbent and a chemical absorbent. This alternate embodiment has the advantage of reducing the $CO_2$ to a very low level as, for example, below 500 parts per million and in some instances, below 50 or 25 parts per million $CO_2$ using basically just one absorption step.

Product hydrogen is withdrawn from $CO_2$ removal zone 23 via line 24. The product hydrogen may be used directly in a hydroconversion unit such as a hydrocracker or hydrotreater. Typically, centrifugal compressor 18 raises the pressure of the hydrogen-$CO_2$ mixture from about 200 psig to a pressure between about 1,500 and 3,500 psig. In a typical hydrogen manufacturing train, the hydrogen gas as obtained from the $CO_2$ removal zone will be subjected to a methanation step in order to convert some residual amounts of carbon oxides to methane because the carbon oxides are usually detrimental to the hydroconversion process.

Example

Feed to the steam-light hydrocarbon reforming furnaces in this example is 35,166 lb./hr. effluent natural gas and 390,000 lb./hr. of 350 psig saturated steam. The natural gas and steam are reacted over a nickel reforming catalyst to obtain an effluent hydrogen-rich gas comprised of $H_2$, $CO_2$, CO, $CH_4$ and $H_2O$ at about 285 psig.

Heat input to the reformer furnaces is bout 970 million British thermal units per hour (MBH), obtained by burning fuel gas. The natural gas and steam reactants are passed through tubes containing the nickel catalyst and the fuel gas is burned in the furnace to supply heat to the tubes. Because of the large amount of heat input there is a considerable amount of heat available in the convection section of the reformer furnaces. Over 500,000 lb./hr. of boiler feed water (BFW) is fed to heat transfer tubes located in the convection section. From this BFW about 525,000 lb./hr. of 1,000 psig steam at 900° F. is produced.

The effluent hydrogen-rich gas from the reformer furnaces is exchanged with heated BFW, then exchanged with the methanator feed, and then passed to a high temperature shift converter. In the high temperature shift converter, CO contained in the hydrogen-rich gas is reacted with $H_2O$ at about 700° F. to produce additional $H_2$ and $CO_2$. The effluent hydrogen-rich gas from the high temperature shift converter is quenched with water and passed to a low temperature shift converter where CO is again reacted with $H_2O$ but at about 450° F. over a copper-zinc oxide catalyst to further reduce the CO content in the hydrogen-rich gas. Effluent hydrogen-rich gas from the low-temperature shift converter contains only a few tenths percent CO.

This effluent hydrogen-rich gas is successively exchanged with 40 psig steam, BFW and finally cooling water (CW) in order to cool the hydrogen-rich gas and condense out $H_2O$.

To about 19,474 moles/hr. of cooled hydrogen-rich gas at about 250 psig, 3,860 moles/hr. of hydrogen-rich gas from a catalytic reformer unit is added. The catalytic reformer hydrogen-rich gas has a molecular weight of about 7.5. The molecular weight of the hydrogen-rich gas is adjusted upward primarily by $CO_2$ which purposely is not removed until after centrifugal compression to high pressure, even though in most instances the $CO_2$ is not ultimately used at a high pressure.

The total hydrogen-rich gas of about 22,334 moles/hr. with an average molecular weight of about 11 is introduced to the first stage centrifugal compressor at about 250 psig and compressed to 637 psig. The first stage centrifugal compressor requires about 14,000 brake horsepower (BHP) and has a theoretical horsepower (THP) requirement of 10,800. 220,000 lb./hr. of the high pressure steam generated in the reformer is used to drive the centrifugal compressor. In accordance with the present invention, the exhaust steam from the turbine driver at about 350 psig is used as process steam for reforming in the reformer furnaces. That is, the exhaust steam is used for reaction with hydrocarbons in the reformer furnace to produce the hydrogen-rich reformer effluent gas.

After cooling the 637 psig effluent gas from the first stage centrifugal compressor, the 637 psig hydrogen-rich gas is introduced to the second stage centrifugal compressor where the gas is compressed to 1,740 psig. BHP for the second stage is about 14,000 and THP is about 11,000. Again, about 220,000 lb./hr. of the 1,000 psig steam obtained by heating BFW in the reformer furnace is used to drive the centrifugal compressor. 170,000 lb./hr. of the exhaust steam from the second stage centrifugal compressor turbine driver is added to the 220,000 lb./hr. from the first stage to furnish the total of 390,000 lb./hr. of 350 psig process steam required for the reforming reaction.

The 1,740 psig hydrogen-rich gas from the second stage centrifugal compressor is then passed to $CO_2$ removal where it flows countercurrent to an N-methyl pyrolidone absorbent in a $CO_2$ absorber operated at about 1,730 psig. The N-methyl pyrolidone absorbent is regenerated primarily by reducing pressure on the $CO_2$-rich absorbent so as to release $CO_2$ from the absorbent. Further regeneration is accomplished by stripping with either nitrogen or air. A total of about 10,000 lb./hr. of 40 psig steam is used in an absorbent "dryer" column to remove water from the N-methyl pyrolidone absorbent.

1,720 psig hydrogen-rich gas containing only a small amount of $CO_2$ is removed from the top of the $CO_2$ absorber. This purified high pressure hydrogen gas may then be used in a hydro-conversion process but in this example is passed through a methanator for conversion of residual carbon oxides to methane prior to use of the high pressure purified hydrogen in hydroconversion.

Compared to a typical prior art hydrogen manufacturing plant producing about 135 million standard cubic feed per day (MSCFD) of hydrogen using standard reciprocating compressors and with no integrated steam usage, the resultant savings using the overall process of the present invention are about $2,000,000 per year in operating costs and about $2,000,000 for initial capital investment.

Although various specific embodiments of the invention have been described and shown, it is to be understood that they are meant to be illustrative only and not limiting. Certain features may be changed without departing from the spirit or essence of the invention. It is apparent that the present invention has broad application to the production of high pressure hydrogen in a process involving steam-hydrocarbon reforming, centrifugal compression of a hydrogen gas comprising $H_2$ and $CO_2$, removal of $CO_2$ using an absorbent comprising a physical absorbent, and driving the centrifugal compressor with a steam turbine with exhaust steam being used as process steam in the reforming step. Accordingly, the invention is not to be construed as limited to the specific embodiments illustrated but only as defined in the appended claims or substantial equivalents of the claims.

We claim:

1. A process for producing high pressure hydrogen which comprises:
    a. reforming hydrocarbons with low pressure steam to produce a gas stream comprising hydrogen and $CO_2$;
    b. centrifugally compressing at least a portion of the gas stream comprising hydrogen and $CO_2$ to obtain a stream comprising compressed hydrogen and $CO_2$;
    c. removing $CO_2$ from the compressed gas stream comprising hydrogen and $CO_2$ by absorbing $CO_2$ in a mixed absorbent comprising a chemical absorbent and a physical absorbent;
    d. using high pressure steam to drive a turbine which turbine in turn drives the centrifugal compressor used to compress the hydrogen and $CO_2$; and
    e. using low pressure exhaust steam from the turbine as said low pressure steam for reforming hydrocarbons in step (a), wherein the low pressure steam is at a pressure between 50 and 500 psig, the high pressure steam is at a pressure between 200 and 2,000 psig, and there is at least a 150 psi differential in pressure between the low and high pressure steam.

2. A process according to claim 1 wherein the low pressure steam is at a pressure between 100 and 350 psig and the high pressure steam is at a pressure between 400 and 1,600 psig.

3. A process in accordance with claim 1 wherein the reforming is carried out at a pressure between atmospheric and 450 psig and at least a portion of the gas comprising hydrogen and $CO_2$ obtained by reforming is centrifugally compressed from a pressure below about 450 psig to a substantially higher pressure before the molecular weight of the hydrogen-$CO_2$ gas to be compressed is reduced below 4 by $CO_2$ removal.

4. A process in accordance with claim 1 wherein the chemical absorbent is an alkanolamine.

5. A process in accordance with claim 1 wherein the chemical absorbent comprises a material selected from the group consisting of monoethanolamine, dipropanolamine and di-isopropanolamine.

6. A process in accordance with claim 1 wherein the chemical absorbent comprises a material selected from the group consisting of monoethanolamine, dipropanolamine and di-isopropanolamine, and the physical absorbent comprises a material selected from the group consisting of methanol, acetone, propylene carbonate, N-methyl pyrrolidone, tetrahydrothiophene 1,1-dioxide and a dimethyl ether of tetraethylene glycol.

* * * * *